US012707366B2

(12) United States Patent
Wu et al.

(10) Patent No.: US 12,707,366 B2
(45) Date of Patent: Aug. 11, 2026

(54) MOBILITY MANAGEMENT FOR HANDOVERS BETWEEN A TERRESTRIAL NETWORK AND A NON-TERRESTRIAL NETWORK

(71) Applicant: QUALCOMM Incorporated, San Diego, CA (US)

(72) Inventors: Shuanshuan Wu, San Diego, CA (US); Hong Cheng, Basking Ridge, NJ (US); Shailesh Patil, San Diego, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/296,869

(22) Filed: Apr. 6, 2023

(65) Prior Publication Data

US 2024/0340748 A1 Oct. 10, 2024

(51) Int. Cl.

| | |
|---|---|
| ***H04W 36/32*** | (2009.01) |
| ***H04W 4/024*** | (2018.01) |
| ***H04W 36/30*** | (2009.01) |
| *H04W 84/06* | (2009.01) |

(52) U.S. Cl.

CPC ......... *H04W 36/322* (2023.05); *H04W 4/024* (2018.02); *H04W 36/304* (2023.05); *H04W 84/06* (2013.01)

(58) Field of Classification Search

CPC . H04W 36/322; H04W 4/024; H04W 36/304; H04W 36/32; H04W 84/06; H04B 7/18541

USPC ........................................................ 455/427

See application file for complete search history.

(56) References Cited

U.S. PATENT DOCUMENTS

| | | | | |
|---|---|---|---|---|
| 2020/0178137 | A1 * | 6/2020 | Hassan Hussein | H04W 36/00837 |
| 2021/0022061 | A1 * | 1/2021 | Chou | H04W 36/22 |
| 2021/0306927 | A1 * | 9/2021 | Wei | H04W 36/0088 |
| 2021/0377849 | A1 * | 12/2021 | Xu | H04W 36/36 |
| 2023/0300692 | A1 * | 9/2023 | Ashari et al. | H04W 36/0069 |
| 2024/0236802 | A1 * | 7/2024 | Sugiyama | H04W 36/083 |

FOREIGN PATENT DOCUMENTS

| | | | | |
|---|---|---|---|---|
| EP | 3432642 A1 | | 1/2019 | |
| EP | 3917209 A1 | | 12/2021 | |
| WO | WO-2023011227 A1 | * | 2/2023 | H04W 36/24 |

OTHER PUBLICATIONS

International Search Report and Written Opinion—PCT/US2024/013790—ISA/EPO—Jun. 14, 2024.

* cited by examiner

*Primary Examiner* — Hirdepal Singh
(74) *Attorney, Agent, or Firm* — Harrity & Harrity, LLP

(57) ABSTRACT

Various aspects of the present disclosure generally relate to wireless communication. In some aspects, a network node may receive navigation information associated with a user equipment (UE). The network node may transmit, based at least in part on the navigation information and a handover boundary, an indication for the UE to perform a handover between a terrestrial network (TN) and a non-terrestrial network (NTN). Numerous other aspects are described.

30 Claims, 8 Drawing Sheets

700

MOBILITY MANAGEMENT FOR HANDOVERS BETWEEN A TERRESTRIAL NETWORK AND A NON-TERRESTRIAL NETWORK

FIELD OF THE DISCLOSURE

Aspects of the present disclosure generally relate to wireless communication and to techniques and apparatuses for mobility management for handovers between a terrestrial network and a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving navigation information associated with a user equipment (UE). The method may include transmitting, based at least in part on the navigation information and a handover boundary, an indication for the UE to perform a handover between a terrestrial network (TN) and a non-terrestrial network (NTN).

Some aspects described herein relate to an apparatus for wireless communication at a network node. The apparatus may include a memory and one or more processors coupled to the memory. The one or more processors may be configured to cause the network node to receive navigation information associated with a UE. The one or more processors may be configured to cause the network node to transmit, based at least in part on the navigation information and a handover boundary, an indication for the UE to perform a handover between a TN and an NTN.

Some aspects described herein relate to a non-transitory computer-readable medium that stores a set of instructions for wireless communication by a network node. The set of instructions, when executed by one or more processors of the network node, may cause the network node to receive navigation information associated with a UE. The set of instructions, when executed by one or more processors of the network node, may cause the network node to transmit, based at least in part on the navigation information and a handover boundary, an indication for the UE to perform a handover between a TN and an NTN.

Some aspects described herein relate to an apparatus for wireless communication. The apparatus may include means for receiving navigation information associated with a UE. The apparatus may include means for transmitting, based at least in part on the navigation information and a handover boundary, an indication for the UE to perform a handover between a TN and an NTN.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features May include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
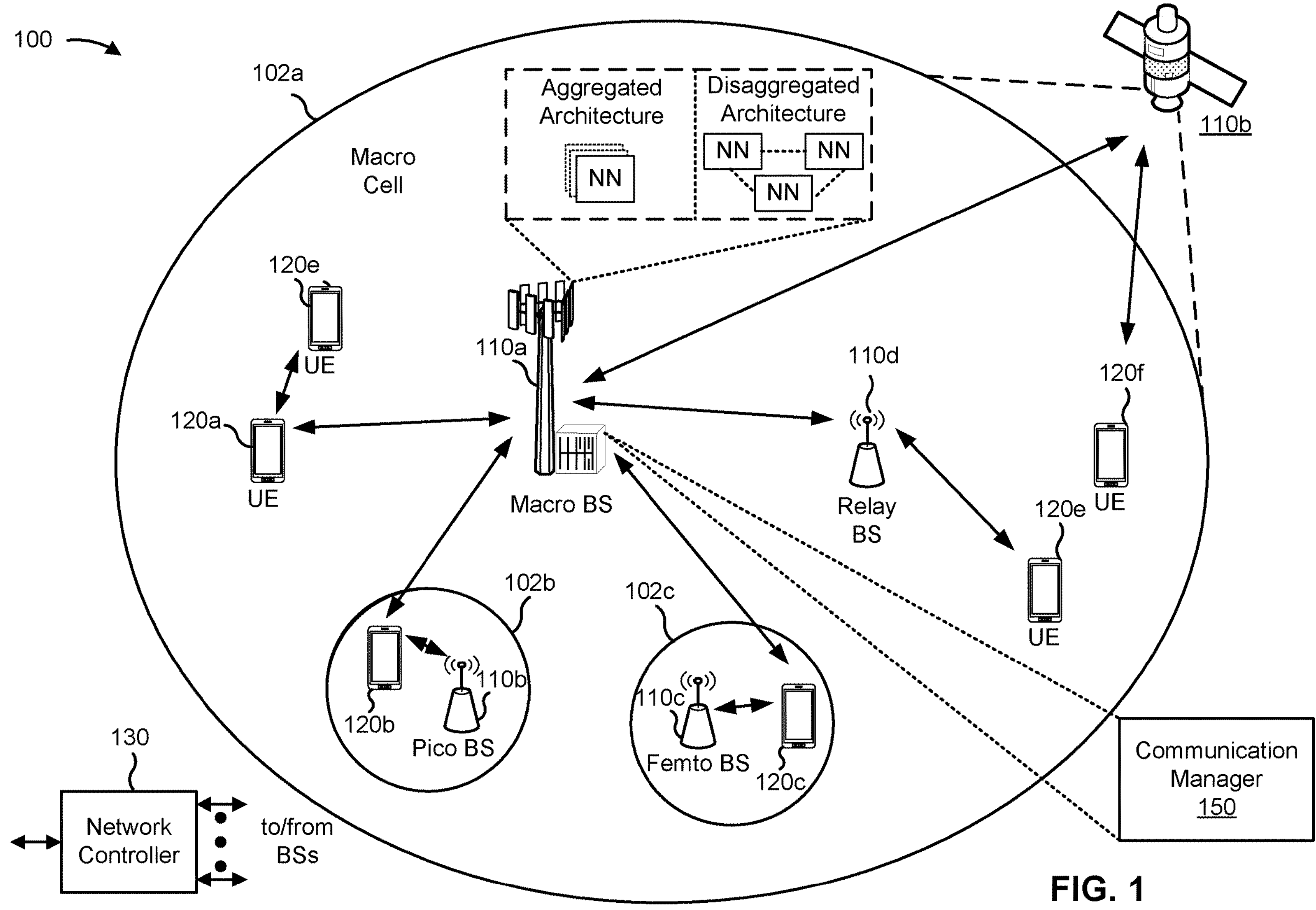
FIG. 1 is a diagram illustrating an example of a wireless network, in accordance with the present disclosure.

A wireless network that includes both a terrestrial network (TN) and a non-terrestrial network (NTN) may provide connectivity to a user equipment (UE) in a variety of operating scenarios. To illustrate, the TN may provide the UE with services in areas with increased base station deployments, and the NTN may provide complementary coverage to the TN in areas with fewer base station deployments. For mobile UEs, such as a UE included in the vehicle, a handover between a terrestrial network node and a non-terrestrial network node may occur more frequently relative to stationary UEs and/or other UEs moving at a slower rate relative to the vehicle. Performing a handover between a terrestrial network node and a non-terrestrial network node may result in more signaling overhead relative to performing a handover between a first terrestrial network node and a second terrestrial network node. Alternatively, or additionally, the UE may encounter a delay while waiting to synchronize to a downlink signal from a target non-terrestrial network node and/or obtaining ephemeris data associated with the target non-terrestrial network node. The delay may interrupt service to the UE, reduce data throughput, and/or increase data transfer latencies.

Some techniques and apparatuses described herein provide mobility management for handovers between a terrestrial network and a non-terrestrial network. In some aspects, a network node (e.g., a terrestrial network node and/or a non-terrestrial network node) may receive navigation information that is associated with a UE. The network node may transmit, based at least in part on the navigation information, an indication for the UE to perform a handover between a terrestrial network node and a non-terrestrial network node. In some aspects, and based at least in part on the navigation information, the network node may obtain a handover boundary that indicates a preferred network node, a preferred network node type (e.g., a terrestrial network node type or a non-terrestrial network node type), and/or a preferred location for performing a handover. Accordingly, the network node may transmit the indication to perform the handover based at least in part on the handover boundary.

By selecting a preferred network node, a preferred network node type, and/or a preferred location for performing a handover based at least in part on navigation information and/or a handover boundary, a network node may reduce signaling overhead at a UE and/or increase a performance (e.g., increased data throughput, increased signal quality, and/or reduced data-transfer latencies) at the UE relative to performing a handover to a non-preferred network node at a non-preferred location. Accordingly, by indicating to perform a handover to a preferred network node at a preferred location (and/or to a preferred network node type), the network node may reduce signaling overhead at the UE and/or mitigate a reduced performance at the UE, resulting in increased data throughput, reduced data transfer latencies, and/or reduced service interruptions to the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

In some examples, and as shown by FIG. 1, a cell may be provided at least in part by the non-terrestrial network node 110*b* of an NTN. Alternatively, or additionally, a wireless network may provide coverage to a UE based at least in part on the non-terrestrial network node 110*b* and the terrestrial network node 110*a*. That is, the wireless network may provide access to both an NTN and a TN. The non-terrestrial network node 110*b* may also be referred to as a non-terrestrial base station or a non-terrestrial access point. "NTN" may denote a network that may be accessed based at least in part on a non-terrestrial network node (e.g., the non-terrestrial network node 110*b*). In some NTN deployments, the non-terrestrial network node 110*b* may be located on an airborne platform or a platform in orbit. Examples of such platforms include a satellite (e.g., a low earth orbit (LEO) satellite, a medium earth orbit (MEO) satellite, and/or a geostationary orbit (GEO) satellite), a balloon, a dirigible, an airplane, an unmanned aerial vehicle (UAV), and/or a drone.

Alternatively or additionally, in some NTN deployments (e.g., a transparent architecture or a bent pipe architecture), the non-terrestrial network node 110*b* may act as a relay station to relay communications between a UE 120 and the terrestrial network node 110*a* (e.g., a terrestrial base station located on the ground or on a tower). In this case, the non-terrestrial network node 110*b* may perform frequency translation and/or radio frequency amplification for communications relayed between the UE 120 and the terrestrial network node 110*a*. For example, the UE 120 may transmit an uplink communication to the non-terrestrial network node 110*b*, which may relay the uplink communication to the terrestrial network node 110*a* (e.g., after performing frequency translation and/or radio frequency amplification). The terrestrial network node 110*a* may perform additional processing on the uplink communication and/or may transmit the uplink communication to a core network. As another example, the terrestrial network node 110*a* may transmit a downlink communication to the non-terrestrial network node 110*b*, which may relay the downlink communication to the UE 120 (e.g., after performing frequency translation and/or radio frequency amplification). In some aspects, a UE 120 and/or the terrestrial network node 110*a* may be referred to as a ground station (GS).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., a network node 110, a network node 110*a*, and/or a network node 110*b*) may include a communication manager 150. As described in more detail elsewhere herein, the communication manager 150 may receive navigation information associated with a UE; and transmit, based at least in part on the navigation information and a handover boundary, an indication for the UE to perform a handover between a TN and an NTN. Additionally, or alternatively, the communication manager 150 may perform one or more other operations described herein.

As indicated above, FIG. 1 is provided as an example. Other examples may differ from what is described with regard to FIG. 1.

Figure 2:
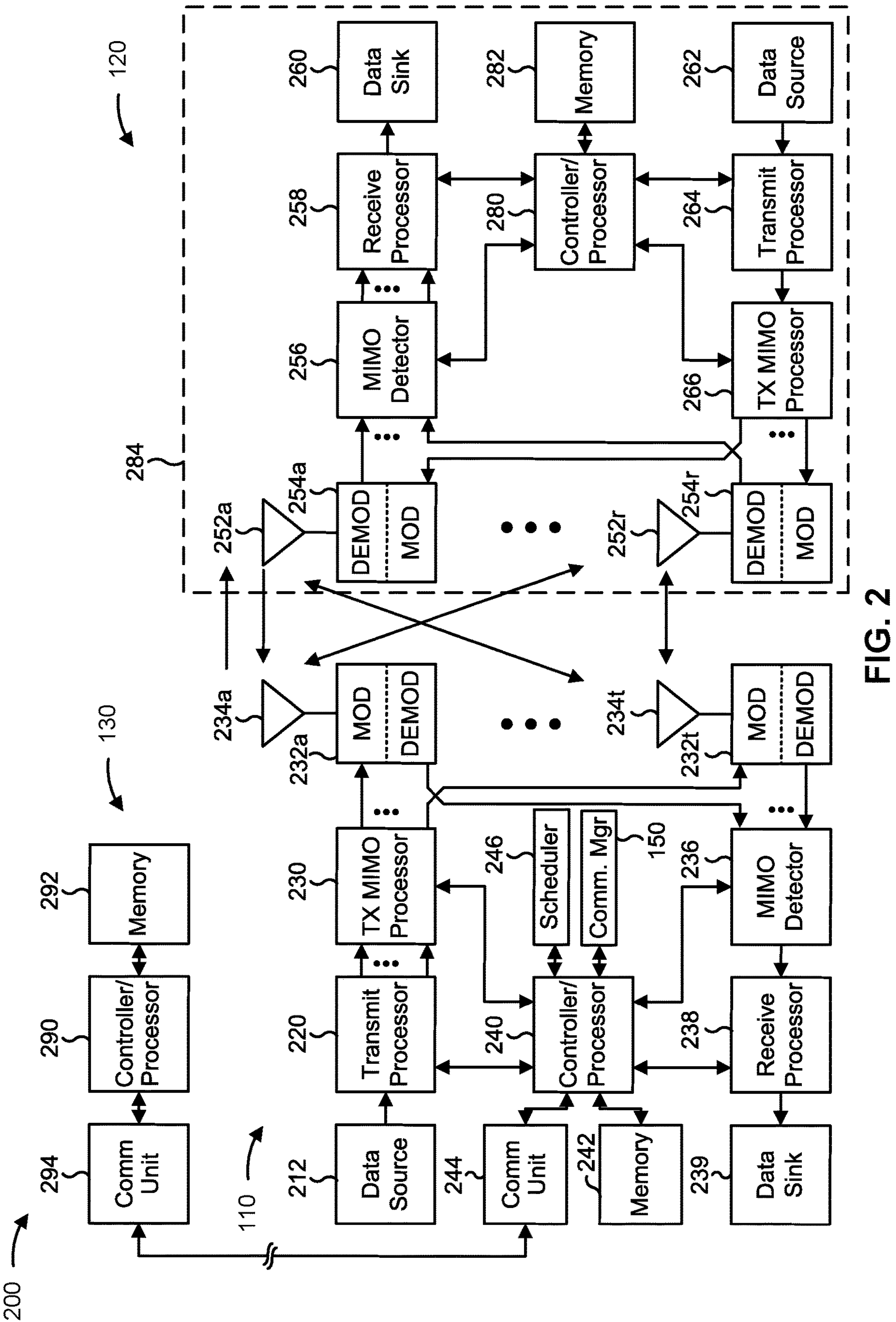
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the network node 110, the controller/processor 280 of the UE 120, and/or any other component(s) of FIG. 2 may perform one or more techniques associated with mobility management for handovers between a TN and an NTN, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a network node (e.g., the network node 110) includes means for receiving navigation information associated with a UE; and/or means for transmitting, based at least in part on the navigation information and a handover boundary, an indication for the UE to perform a handover between a TN and an NTN. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
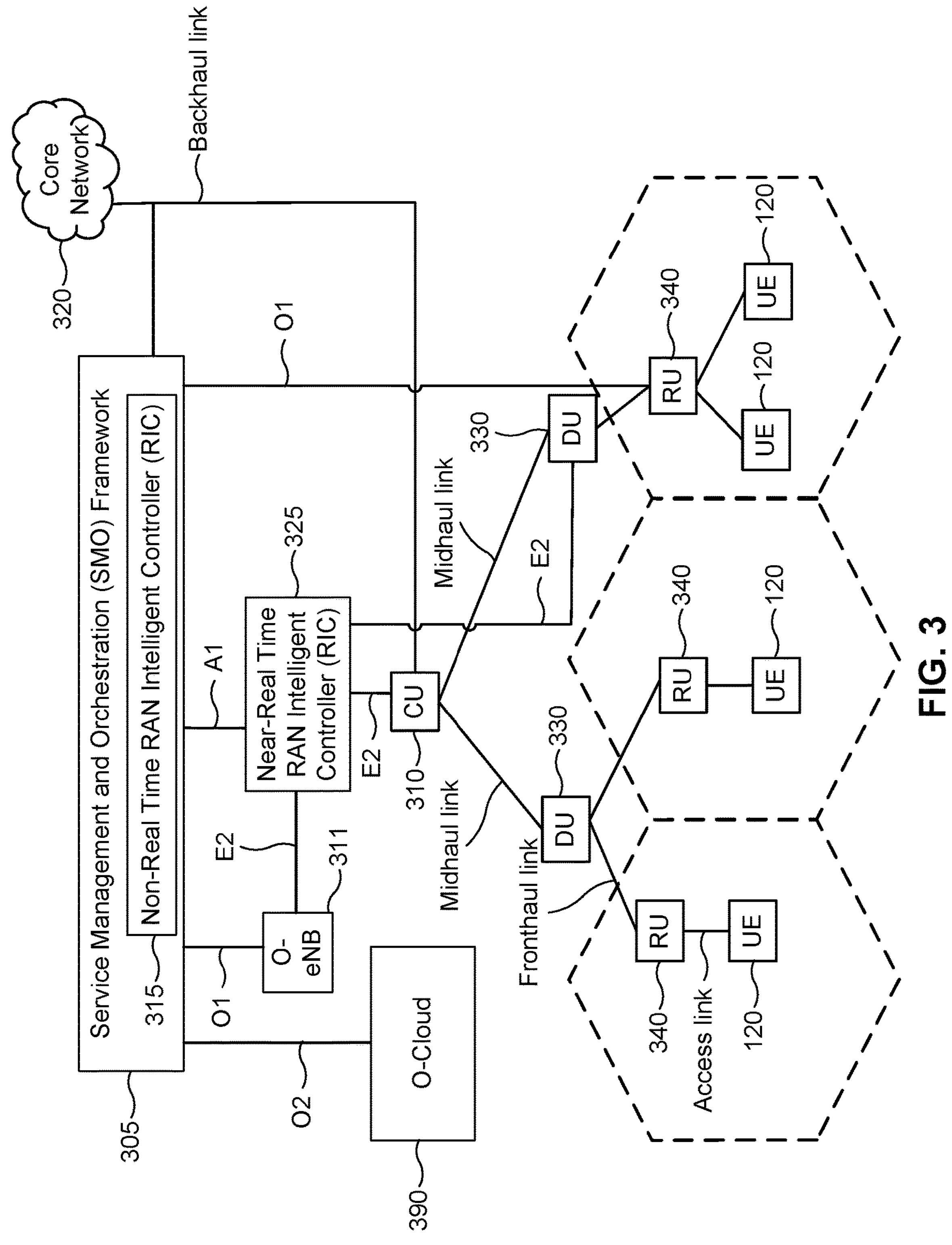
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
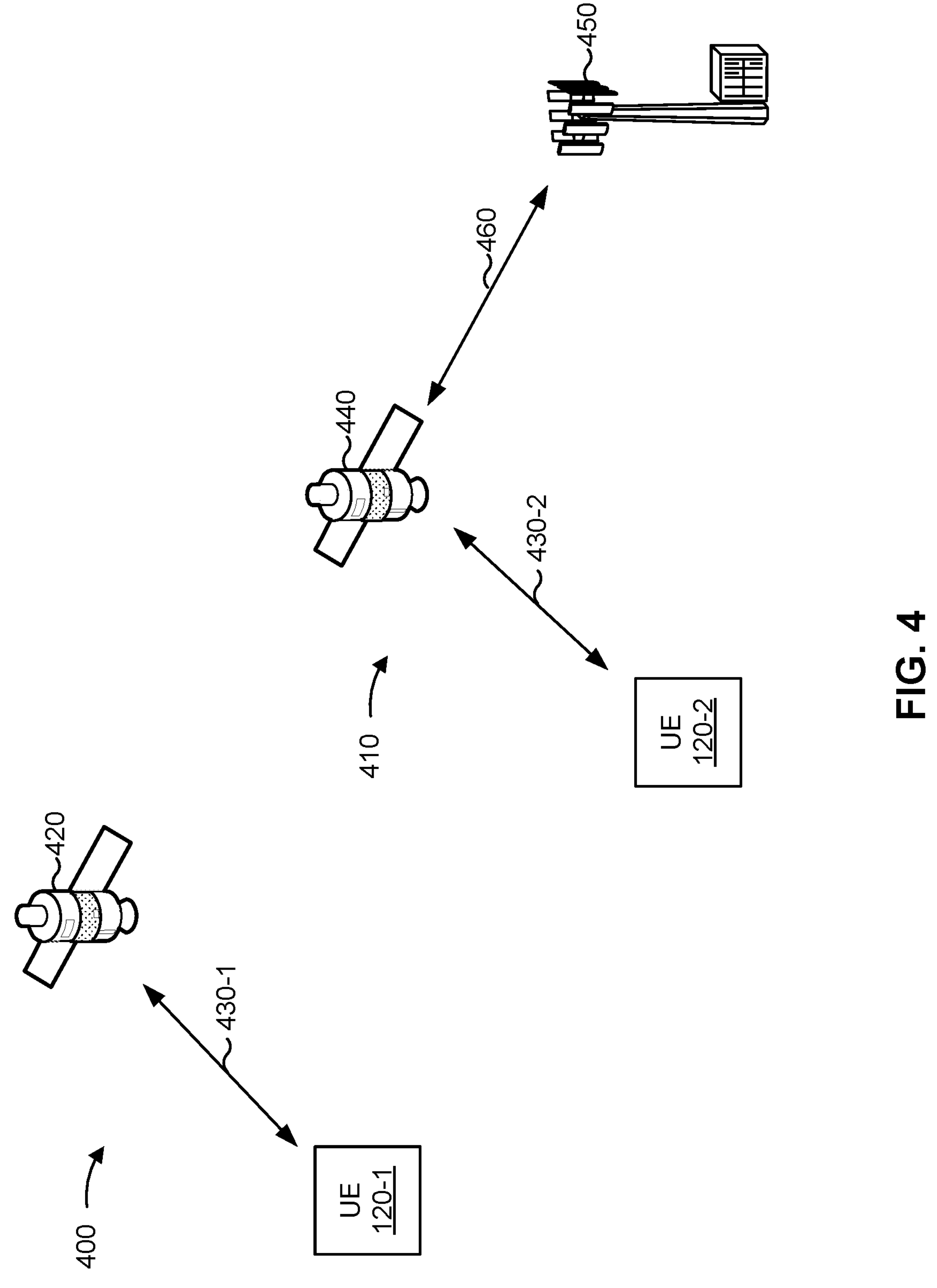
FIG. 4 is a diagram illustrating an example of a regenerative satellite deployment and an example of a transparent satellite deployment in a non-terrestrial network.

FIG. 4 is a diagram illustrating an example 400 of a regenerative satellite deployment and an example 410 of a transparent satellite deployment in a non-terrestrial network.

Example 400 shows a regenerative satellite deployment in which a first UE 120-1 is served by a satellite 420 via a service link 430-1. In some aspects, the satellite 420 may include base station capabilities (e.g., capabilities associated with the network node 110*a* and/or a gNB), and may be referred to as a non-terrestrial base station, a regenerative repeater, or an on-board processing repeater. Based at least in part on including the base station capabilities, the satellite 420 may demodulate an uplink radio frequency signal, and may modulate a baseband signal derived from the uplink radio signal to produce a downlink radio frequency transmission. To illustrate, the satellite 420 may transmit the downlink radio frequency signal on the service link 430-1. The satellite 420 may provide network access to the UE 120-1 over a coverage area (e.g., a cell coverage area). The first UE 120-1 may include a Global Navigation Satellite System (GNSS) capability or a Global Positioning System (GPS) capability.

Example 410 shows a transparent satellite deployment, which may also be referred to as a bent-pipe satellite deployment. In the example 410, a second UE 120-2 is served by a satellite 440 via the service link 430-2, where the satellite 440 may be referred to as a transparent satellite. To illustrate, the satellite 440 may act as a relay by receiving a signal from gateway 450 via a feeder link 460, and relaying the signal to the UE 120-2 via the service link 430-2. Alternatively or additionally, the satellite 440 may receive an uplink radio frequency transmission from the UE 120-2 via the service link 430-2, and relay the uplink radio frequency transmission to the gateway 450 via the feeder link 460 without demodulating the uplink radio frequency transmission. In some aspects, the satellite 440 may perform a frequency conversion on the uplink radio frequency transmission from a first frequency (e.g., associated with the service link 430-2) to a second frequency (e.g., associated with the feeder link 460), and may amplify and/or filter the uplink radio frequency transmission. The satellite 440 may provide network access to the UE 120-2 while the UE 120-2 operates in a coverage area associated with the satellite 440. The second UE 120-2 may include a GNSS capability or a GPS capability.

As shown by the example 410, the satellite 440 and the UE 120-2 may communicate with one another based at least in part on the service link 430-2. The service link 430-2 may include an uplink for transmitting an uplink communication (e.g., from the UE 120-2 to the gateway 450 by way of the satellite 440) and/or a downlink for transmitting a downlink communication (e.g., from the gateway 450 to the UE 120-2 by way of the satellite 440). In a similar manner, the satellite 440 and the gateway 450 may communicate with one another based at least in part on the feeder link 460, where the feeder link 460 may include an uplink for transmitting an uplink communication and/or a downlink for transmitting a downlink communication.

The feeder link 460, the service link 430-1, and/or the service link 430-2 may each experience Doppler shift due to the movement of the satellites 420 and 440, and/or movement of the UE 120-1 or the UE 120-2. A Doppler shift associated with satellite movement may be significantly larger than a Doppler shift associated with a terrestrial network, based at least in part on a speed at which a satellite moves. In some aspects, a transmitting device may pre-compensate for a satellite-based Doppler shift. To illustrate, the feeder link 460 between the gateway 450 and the satellite 440 may be a 1:1 link between a single transmitting device and a single receiving device. Based at least in part on the feeder link 460 being a 1:1 link, the gateway 450 and/or another network node may estimate a feeder link Doppler shift and pre-compensate (e.g., modify the transmitted signal) to mitigate the Doppler shift observed by the satellite 440. The satellite 440 may communicate with multiple UEs at varying locations based at least in part on a 1:N link, where Nis an integer that may be greater than 1. To illustrate, the satellite 440 may broadcast information that is received and processed by N UEs at varying locations. The varying locations of the receiving UEs may result in each UE observing a different service link Doppler shift. Accordingly, the satellite 440 may refrain from applying pre-compensation for a service link Doppler shift based at least in part on the 1:N link and the variation in the observed service link Doppler shift between each UE. These sources of frequency error may cause a received downlink frequency at the UE 120 to drift from a target downlink frequency.

As indicated above, FIG. 4 is provided as an example. Other examples may differ from what is described with regard to FIG. 4.

Figure 5:
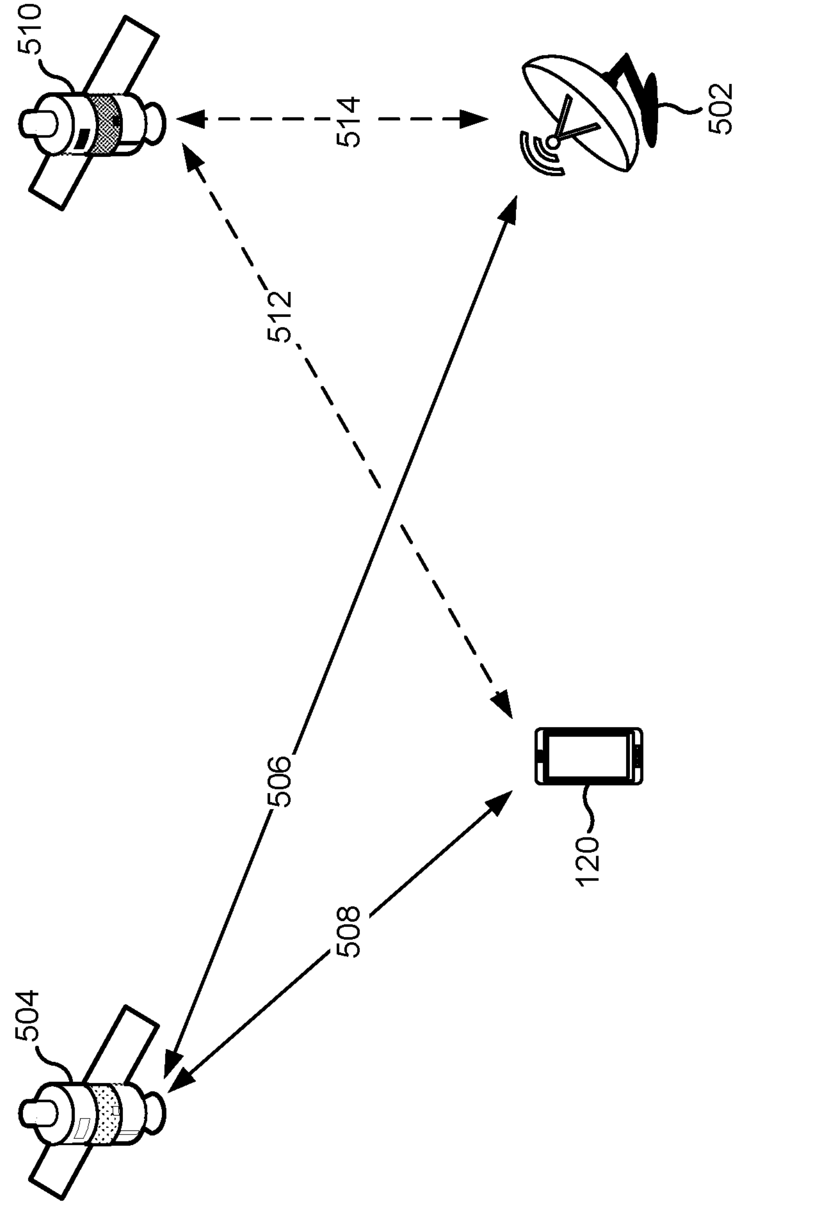
FIG. 5 is a diagram illustrating an example of mobility in a non-terrestrial network (NTN), in accordance with the present disclosure.

FIG. 5 is a diagram illustrating an example 500 of mobility in an NTN, in accordance with the present disclosure.

An NTN may provide wireless access and/or service coverage in areas in which terrestrial cellular service is unavailable and/or difficult to reach (e.g., a mountain top, a body of water, and/or a canyon, among other examples). To illustrate, a UE 120 may receive a downlink communication from a gateway 502 by way of a first satellite 504. The first satellite 504 may wirelessly receive the downlink communication from the gateway 502 using a feeder link 506 and relay the downlink communication to the UE 120 using a service link 508. Alternatively, or additionally, and as described with regard to FIG. 4, the first satellite 504 may include base station functionality and communicate with the UE 120 as a regenerative satellite. The service link 508 and/or the feeder link 506 may alternatively or additionally be used for an uplink transmission.

As part of mobility support in an NTN, a UE may perform a handover from a first network node (e.g., the first satellite 504 or a first cell provided by the first satellite 504) to a second network node (e.g., a second satellite 510, a second cell provided the second satellite 510, and/or a second cell provided by the first satellite 504). For example, the UE 120 may disconnect from the first satellite 504 (e.g., by tearing down the service link 508), and connect to the gateway 502 based at least in part on a second service link 512 to the second satellite 510 and a second feeder link 514 between the second satellite 510 and the gateway 502. The second service link 512 and/or the second feeder link 514 may alternatively or additionally be used for an uplink transmission.

Alternatively, or additionally, the UE 120 may perform a handover from a terrestrial network node (e.g., the terrestrial network node 110*a* of FIG. 1) to a non-terrestrial network node (e.g., the non-terrestrial network node 110*b* of FIG. 1, the first satellite 504, and/or the second satellite 510), or vice versa. To illustrate, the UE 120 may be implemented as an on-board unit (OBU) of a vehicle. In some aspects, the OBU may manage sidelink communications with other UEs, such as a UE included in another vehicle, a UE implemented as a road-side unit (RSU), and/or a UE implemented as a vulnerable road user (VRU) (e.g., a scooter and/or smartphone). Alternatively, or additionally, the OBU may connect to a wireless network using an access link and/or Uu link. The wireless network may include terrestrial network nodes and non-terrestrial network nodes, and the OBU may perform a handover between a terrestrial network node and a non-terrestrial network node based at least in part on a mobility of the OBU (e.g., via the vehicle) and/or the OBU changing locations and/or positions.

A wireless network that includes both a TN and an NTN may provide connectivity to the UE 120 in a variety of operating scenarios. To illustrate, the TN may provide the UE with services in a majority of scenarios, such as urban areas and/or high traffic roads (e.g., freeways and/or highways) with increased base station deployments. The NTN may provide complementary coverage to the TN in other areas, such as remote locations with fewer base station deployments and/or areas with challenging terrain for terrestrial base stations (e.g., a canyon and/or mountains). Accordingly, in some areas, the TN may have compromised service (e.g., no service, reduced services, and/or congested services), and the UE 120 may perform a handover from a terrestrial base station to a non-terrestrial network node to access voice and/or data services provided by the wireless network. For example, in areas where a terrestrial network node provides compromised services, a UE in the form of an OBU of a moving vehicle may perform a handover to a non-terrestrial network node to access broadband services for a telematics application, an advanced driver assistance system (ADAS) application, and/or a navigation application. As another example, the UE may connect to the non-terrestrial network node to meet a quality-of-service (QoS) condition when the terrestrial network node is congested and/or loaded close to capacity.

For mobile UEs, such as a smartphone in a vehicle and/or an OBU included in the vehicle, a handover between a terrestrial network node and a non-terrestrial network node may occur more frequently relative to stationary UEs and/or other UEs moving at a slower rate relative to the vehicle. To illustrate, a vehicle may enter and/or exit coverage areas provided by the terrestrial network node(s) and/or the non-terrestrial network node(s) more quickly based at least in part on the faster rate at which the vehicle travels. Alternatively, or additionally, a fast-moving UE may observe different channel conditions, different signal qualities (e.g., RSSI and/or RSRP) relative to a stationary UE (and/or a slower UE) that result in reduced performance (e.g., reduced signal quality, reduced data throughput, and/or increased data transfer latency) and, subsequently, may perform more handovers to improve performance. To illustrate, a UE may measure and/or evaluate a respective signal quality of a serving network node in addition to surrounding (non-serving) network nodes to identify a target network node with a higher signal quality (e.g., a higher RSSI and/or a higher RSRP) relative to the source network node.

Performing a handover between a terrestrial network node and a non-terrestrial network node may result in more signaling overhead relative to performing a handover between a first terrestrial network node and a second terrestrial network node. To illustrate, to evaluate a signal quality of a downlink signal from a non-terrestrial network node, the UE may obtain first ephemeris data (e.g., timing information, a current location and/or position, a predicted location and/or predicted position, trajectory and/or orbit information, an epoch time, a velocity vector, a location vector, and/or an identifier) associated with the non-terrestrial network node. Alternatively, or additionally, the UE may obtain second ephemeris data associated with the non-terrestrial network node to transmit an uplink communication to the non-terrestrial network node. The first ephemeris data and the second ephemeris data may be associated with different validity time windows based at least in part on different timing conditions associated with receiving a downlink communication and transmitting an uplink communication. The increased signaling overhead may result in reduced data throughput and/or increased data transfer latencies within a wireless network (e.g., that includes an TN and an NTN). Alternatively, or additionally, the UE may encounter a delay while waiting to synchronize to a downlink signal from the target non-terrestrial network node and/or obtaining ephemeris data associated with a target non-terrestrial network node. The delay may interrupt service to the UE, reduce data throughput, and/or increase data transfer latencies.

Some techniques and apparatuses described herein provide mobility management for handovers between a terrestrial network and a non-terrestrial network. In some aspects, a network node (e.g., a terrestrial network node and/or a non-terrestrial network node) may receive navigation information that is associated with a UE. For example, the navigation information may indicate any combination of a position and/or location of the UE, a set of locations associated with the UE, a landmark, a speed of the UE, a direction of the UE, and/or a velocity of the UE. The network node may transmit, based at least in part on the navigation information, an indication for the UE to perform a handover between a terrestrial network node and a non-terrestrial network node.

To illustrate, and based at least in part on the navigation information, the network node may obtain a handover boundary that indicates a preferred network node, a preferred network node type (e.g., a terrestrial network node type or a non-terrestrial network node type), and/or a preferred location for performing a handover. The preferred network node, the preferred network node type, and/or the preferred location may be selected by the network node based at least in part on meeting an operating condition at the UE, such as an operating condition associated with a QoS flow and/or a UE capability. Alternatively, or additionally, the network node may select the preferred network node, the preferred network node type, and/or the preferred location based at least in part on a coverage quality metric associated with the preferred network node as described below. That is, the network node may select a preferred network node, a preferred network node type, and/or a preferred location for performing a handover that reduces signaling overhead at the UE and/or increases a performance (e.g., increased data throughput, increased signal quality, and/or reduced data-transfer latencies) at the UE relative to performing a handover to a non-preferred network node at a non-preferred location. Accordingly, by indicating to perform a handover to a preferred network node at a preferred location (and/or to a preferred network node type), the network node may reduce signaling overhead at the UE and/or mitigate a reduced performance at the UE, resulting in increased data throughput, reduced data transfer latencies, and/or reduced service interruptions to the UE.

As indicated above, FIG. 5 is provided as an example. Other examples may differ from what is described with regard to FIG. 5.

Figure 6:
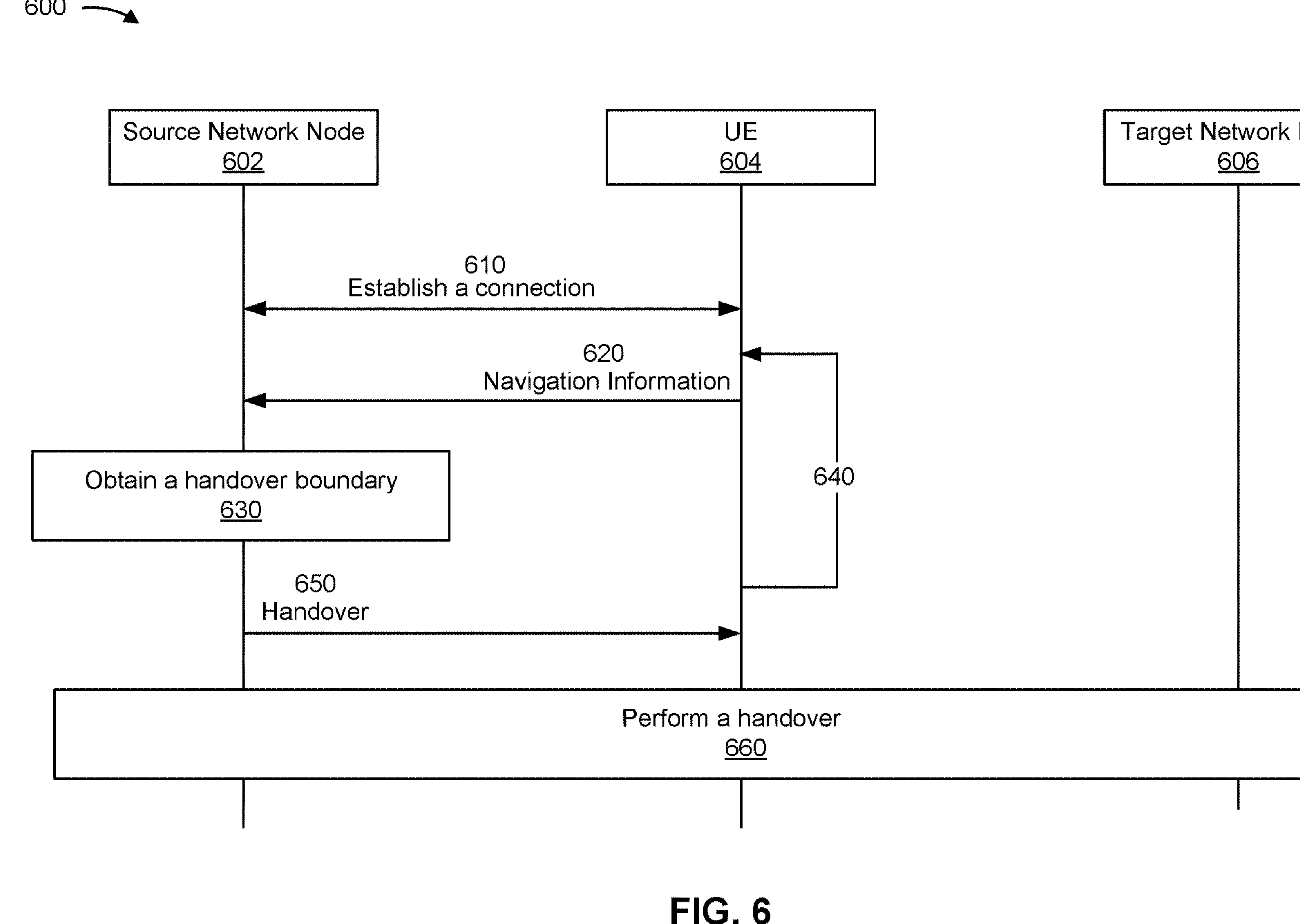
FIG. 6 is a diagram illustrating an example of a wireless communication process between a first network node, a UE, and a second network node, in accordance with the present disclosure.

FIG. 6 is a diagram illustrating an example 600 of a wireless communication process between a first network node 602 (e.g., a terrestrial network node 110*a* and/or a non-terrestrial network node 110*b*), a UE 604 (e.g., a UE 120), and a second network node 606 (e.g., another terrestrial network node 110*a* and/or another non-terrestrial network node 110*b*), in accordance with the present disclosure. In some aspects, the first network node 602 may be a terrestrial network node or a non-terrestrial node, and the second network node 606 may be a non-terrestrial network node or a terrestrial network node.

As shown by reference number 610, a first network node 602 and a UE 604 may establish a connection. For example, the UE 604 may power up in a coverage area provided by the first network node 602 and may establish a link with the first network node 602, such as by performing a registration procedure. As another example, the UE 604 may perform a handover to the first network node 602. As part of establishing the connection, the UE 604 may indicate capability information to the first network node 602. To illustrate, the UE 604 may indicate (e.g., autonomously or in response to a request from the first network node 602) support for navigation-based handovers and/or support for indicating navigation information to the first network node 602.

Based at least in part on establishing a connection with the UE 604, the first network node 602 may instruct the UE 604 to enable navigation-based handovers. In other examples, navigation-based handovers may implicitly be enabled based at least in part on the UE 604 indicating support for the navigation-based handovers and the UE 604 being connected (e.g., radio resource control (RRC) connected) to the first network node 602. That is, the first network node 602 and the UE 604 will operate with navigation-based handovers being enabled based at least in part on the UE 604 indicating support for navigation-based handovers (e.g., and without the first network node 602 transmitting an explicit instruction to enable the navigation-based handovers). In other examples, an application and/or a service may enable navigation-based handovers, such as when the application and/or the service is associated with a QoS and/or a 5G QoS identifier (5QI) value (e.g., a priority level, a latency limit, an error rate, and/or a bit rate) that satisfies an enable threshold.

Alternatively, or additionally, the first network node 602 may instruct the UE 604 to transmit navigation information. In some aspects, the first network node 602 may configure one or more parameters associated with the UE transmitting the navigation information, such as a periodicity, a navigation format (e.g., a coordinate-based navigation format and/or a landmark-based navigation format), a distance threshold, and/or a time window. In some aspects, the first network node 602 may allocate one or more air interface resources (e.g., characterized based at least in part on a frequency partition and/or a time partition) to the UE 604 for transmitting the navigation information, such as by allocating a configured grant associated with a physical uplink shared channel (PUSCH) to the UE 604 and/or allocating resource(s) in a physical uplink control channel (PUCCH). However, in other examples, the first network node 602 may not configure the one or more parameters associated with transmitting the navigation information and/or may not allocate air interface resources to the UE 604.

Based at least in part on establishing the connection with the UE 604, the first network node 602 may obtain one or more operating conditions associated with the UE 604. As one example, the first network node 602 may establish one or more QoS flows with the UE 604, and each QoS flow may have one or more respective operating conditions, such as one or more respective 5QI values (e.g., a priority level, a latency limit, an error rate, and/or a bit rate). Other non-limiting examples of operating conditions may include an operating condition associated with a UE capability, such as a number of antennas for TN communications, a number of antennas for NTN communications, an antenna type, a UE type (e.g., an OBU, a smartphone, and/or a laptop), and/or a power consumption operating condition.

As shown by reference number 620, the UE 604 may transmit, and the first network node 602 may receive, navigation information. While the UE 604 may transmit the navigation information directly to the first network node 602 in the example 600, other examples may include the UE 604 transmitting the navigation information indirectly to the first network node 602, such as by transmitting the navigation information to an application server (e.g., in user data), and the application server forwarding the navigation information to the first network node 602 and/or a core network node associated with the first network node 602. The navigation information may include a position and/or a location of the UE 604 and/or a travel route of the UE 604. As one example, the UE 604 may transmit navigation information that is based at least in part on a positioning service (e.g., a global navigation satellite system (GNSS) and/or global positioning system (GPS)), such as by indicating one or more coordinates (e.g., latitude and longitude coordinates). That is, a position and/or a location of the UE 604 and/or a travel route of the UE 604 may be indicated through one or more coordinates. To illustrate, a travel route may be specified through a set of coordinates that are included in the travel route. Alternatively, or additionally, and in a similar manner as a coordinate, the UE 604 may transmit landmark-based navigation information (e.g., a single landmark or a set of landmarks), such as, by way of example and not of limitation, a road name, a street address, a mile marker, a start location, an end location, and/or one or more crossroads. In some aspects, the UE 604 may report the landmark-based navigation information based at least in part on a distance threshold, such as by reporting one or more landmarks at locations whose distance from the UE satisfies the distance threshold. The UE 604 may transmit, as the navigation information, single navigation information or a set of navigation information. To illustrate, the UE 604 may transmit, as the navigation information, a single location (e.g., coordinates for a single location and/or a single landmark) or a set of locations (e.g., a set of coordinates for a set of locations and/or a set of landmarks). Sets of navigation information may be based at least in part on a distance threshold, such as locations at distances from the UE that satisfy the distance threshold, and/or a time window, such as locations and/or positions at which the UE operated during the time window. Alternatively or additionally, sets of navigation information may indicate travel route information.

As described below with regard to reference number 640, the UE 604 may iteratively transmit navigation information, such as by transmitting baseline navigation information and/or updated navigation information. For example, the baseline navigation information may be first absolute coordinates from a GNSS, and the updated navigation information may be second absolute coordinates from the GNSS (e.g., that have changed from the first absolute coordinates). As another example, the updated navigation information may be delta coordinates, difference coordinates, and/or delta values that indicate a difference in location relative to the first absolute coordinates of the baseline navigation information. In some aspects, the updated navigation information may specify updated travel route information and/or an updated end location.

The UE 604 may transmit the navigation information (e.g., location information and/or travel route information) in a variety of manners. As one example, the UE 604 may transmit the navigation information in an application layer message (e.g., in user data), such as an application layer message to a V2X application server and/or an ADAS server. In some aspects, the application server may forward the navigation information to a network entity (e.g., a core network entity) associated with the first network node 602. As another example, the UE 604 may transmit the navigation information in a protocol layer message. To illustrate, the UE 604 may transmit the navigation information in a non-access-stratum-layer (NAS) message that is forwarded to a core network entity (e.g., an access and mobility management function (AMF) network entity). As another example, the UE 604 may transmit the navigation information in an access stratum (AS) layer message to a radio access network (RAN) network node, the RAN network node may forward the navigation information to an AMF network entity, and the AMF network entity may forward the navigation information to an application server.

As shown by reference number 630, the first network node 602 may obtain a handover boundary. For example, the first network node 602 may obtain a handover boundary map that specifies one or more handover boundaries selected by a network node (e.g., a network-selected handover boundary) for performing a handover, and the first network node 602 may select the handover boundary from the handover boundary map based at least in part on any combination of an operating condition at the UE 604, navigation information associated with the UE 604, and/or a coverage quality metric associated with another network node. In some aspects, a coverage area map may indicate one or more coverage area boundaries that are associated with one or more terrestrial network nodes and/or one or more non-terrestrial network nodes. Alternatively, or additionally, a coverage area map may indicate one or more respective coverage area quality metrics, as described below, for respective coverage areas. The first network node 602 may select a first handover boundary based at least in part on a position and/or a location of the UE 604 and/or a second handover boundary based at least in part on an expected position and/or an expected location of the UE 604 (e.g., based at least in part on a planned route). A handover boundary and/or a handover boundary map may be based at least in part on the coverage area map.

In some aspects, a handover boundary map may indicate one or more handover boundaries that differ from coverage boundaries indicated by a coverage area map. To illustrate, a coverage area map may indicate one or more boundaries and/or locations of coverage areas provided by network nodes (e.g., terrestrial and/or non-terrestrial) in a wireless network. A handover boundary map may indicate a preferred location, a preferred network node, and/or a preferred network node type for performing a handover. The preferred network node, the preferred network node type, and/or the preferred location indicated by a handover boundary may be based at least in part on one or more operating conditions at the UE (e.g., a 5QI value and/or a UE capability) and/or one or more operating conditions at a network node (e.g., a coverage quality metric, a capacity metric, and/or a congestion metric). To illustrate, a coverage area map may indicate, at a first location, a coverage boundary between a first coverage area provided by a terrestrial network node and a second coverage area provided by a first non-terrestrial network node. A handover boundary map may indicate, for the first location, to refrain from performing the handover from the first terrestrial network node and the first non-terrestrial network node. That is, the handover boundary map may not include a handover boundary for the first location. For example, the handover boundary map may determine to not include a handover boundary for the first location based at least in part on a coverage quality metric, a capacity metric, and/or a congestion metric associated with the first non-terrestrial network node that indicates that the first non-terrestrial network node may be unable to provide a UE with a data throughput, a data transfer latency, and/or a signal quality that meets an operating condition of the UE.

Alternatively, or additionally, the handover boundary map may indicate, by way of a handover boundary, to perform the handover from the first terrestrial network node to a second terrestrial network node at the first location and/or to perform a handover from the first terrestrial network node to a second non-terrestrial network node at a second location. To illustrate, and in a similar manner as described above, a coverage quality metric, a capacity metric, and/or a congestion metric associated with the second non-terrestrial network node and/or the second terrestrial network node may indicate that the respective network node may be able to provide a UE with a data throughput, a data transfer latency, and/or a signal quality that meets an operating condition of the UE. Thus, a handover boundary and/or a handover boundary map may identify one or more preferred handover locations, one or more preferred network node types, and/or one or more preferred network nodes that may provide a UE with increased performance (e.g., in addition to connectivity) and/or reduced signaling overhead relative to other handover locations, other network nodes, and/or other network node types.

In some aspects, the first network node 602 may obtain a handover boundary map and/or a handover boundary from an application server. As another example, the first network node 602 may obtain the handover boundary map and/or the handover boundary from a core network entity and/or a RAN network node. Alternatively, or additionally, the first network node 602 may calculate the handover boundary and/or the handover boundary map. To illustrate, the first network node 602 may obtain an operating condition associated with the UE 604 as described with regard to reference number 610, navigation information from the UE 604 as described with regard to reference number 620, and/or a respective coverage quality metric associated with one or more other network nodes (e.g., within a distance threshold of the UE 604) from a core network node and/or through a backhaul link with the other network nodes. The first network node 602 may calculate a handover boundary and/or a handover boundary map based in part on any combination of the UE operating condition, the navigation information, and/or the respective coverage quality metric(s). A coverage quality metric associated with a network node (e.g., a terrestrial network node and/or a non-terrestrial network node) may include, by way of example and not of limitation, an experienced signal metric (e.g., experienced RSSI and/or experienced RSRP), an experienced data throughput, and/or an experienced data rate that is observed by another UE when connecting to the network node. Alternatively, or additionally, the coverage quality metric may indicate a congestion metric and/or a loading metric.

In some aspects, a handover boundary may indicate a boundary (e.g., a location selected by a network node and/or an application server) for triggering and/or performing a handover between two network nodes. The handover boundary may implicitly indicate that performing a handover at the handover boundary (e.g., to a preferred network node and/or within range of the preferred location) may provide the UE with service and/or a performance that meets an operating condition of the UE. Alternatively, or additionally, the handover boundary may implicitly indicate that performing the handover at the handover boundary may provide the UE with commensurate (e.g., within a range of values or within a threshold) data throughput, commensurate signal quality, and/or a commensurate data rate from a (preferred) target network node as a source network node.

An entity calculating a handover boundary and/or a handover boundary map (e.g., an application server, a core network, a RAN network node, and/or the first network node) may calculate the handover boundary and/or the handover boundary map based at least in part on a coverage area map and/or a coverage quality metric. In some aspects, the entity may reject and/or refrain from selecting a coverage area boundary (e.g., indicated by the coverage area map) that is associated with a potential network node as a handover boundary based at least in part on a coverage quality metric associated with the potential network node failing to satisfy a quality threshold. The quality threshold may be based at least in part on an operating condition of the UE 604, such as a QoS flow, a 5QI value associated with the QoS flow, and/or a UE capability. Alternatively, or additionally, the entity may select a second coverage area boundary (e.g., indicated by the coverage area map) that is associated with another network node as a handover boundary based at least in part on a second coverage quality metric associated with the other network node satisfying the quality threshold.

Accordingly, a handover boundary (e.g., a network-selected handover boundary) may indicate a boundary associated with performing a handover to a preferred network node, a preferred network node type, and/or a preferred location for performing the handover to satisfy one or more operating conditions at the UE 604. Alternatively, or additionally, the handover boundary may implicitly indicate to not perform a handover with another network node that is not associated with the handover boundary. A handover boundary may be associated with two network nodes, an operating condition, and/or a coverage quality metric. In some aspects, a handover boundary map may indicate multiple sets of handover boundaries, such as a first set of handover boundaries associated with a first coverage quality metric, a second set of handover boundaries associated with a second coverage quality metric, and/or a third set of handover boundaries associated with a third coverage quality metric. A handover associated with a handover boundary may include a handover from a source terrestrial network node to a target non-terrestrial network node. As another example, a handover associated with a handover boundary may be from a source non-terrestrial network node to a target terrestrial network node.

As shown by reference number 640, the UE 604 may iteratively transmit, and the first network node 602 may iteratively receive, navigation information as described with regard to reference number 620. Alternatively, or additionally, the first network node 602 may iteratively obtain a handover boundary, such as by obtaining an updated handover boundary map and/or by selecting an updated handover boundary based at least in part on the (updated) navigation information. In some aspects, the UE 604 may transmit navigation information based at least in part on the UE changes locations by a distance that satisfies an update threshold. Alternatively, or additionally, the UE 604 may transmit navigation information periodically and/or on-demand (e.g., in response to a query from the first network node 602). The UE 604 may transmit absolute navigation information (e.g., absolute GNSS coordinates) and/or delta navigation information (e.g., relative to a baseline navigation information and/or the last prior updated navigation information). Alternatively, or additionally, the UE 604 may transmit updated travel route information and/or an updated end location.

As shown by reference number 650, the first network node 602 may transmit, and the UE 604 may receive, an indication to perform a handover to a second network node 606. In some aspects, the first network node 602 may be a source network node serving the UE 604, such as a terrestrial network node and/or a non-terrestrial network node. In other aspects, the first network node 602 may be part of a disaggregated base station (e.g., as described with regard to FIG. 3) that is connected to a source network node serving the UE 604. The indication to perform a handover may be associated with a handover between a TN and an NTN, such as a first handover from a terrestrial network node to a non-terrestrial network node, or a second handover from a non-terrestrial network node to a terrestrial network node. Alternatively, or additionally, the first network node 602 may transmit the indication based at least in part on navigation-based handovers being enabled.

In some aspects, the first network node 602 may identify a trigger event associated with transmitting the indication to perform a handover, such as a distance-based trigger event. For instance, the first network node 602 may calculate a distance between an updated location and/or an updated position of the UE (e.g., from the navigation information) and the handover boundary, and determine, as the trigger event, that the distance satisfies a handover distance threshold. Thus, the first network node 602 may transmit the indication to perform the handover based at least in part on identifying the trigger event. In some aspects, the first network node 602 may transmit the indication to perform the handover without instructing the UE 604 to return a measurement report associated with a target network node (e.g., the second network node 606) and/or without obtaining a current quality metric associated with a target network node of the handover. However, in other aspects, the first network node 602 may obtain the current quality metric (e.g., from the UE 604) and may determine, as the trigger event, that the current quality metric satisfies a quality threshold. Accordingly, the first network node 602 may transmit the indication to perform the handover based at least in part on the current quality metric satisfying the quality threshold. In some aspects, the first network node 602 is a RAN network node, and identifying the trigger event is based at least in part on the UE being attached to the RAN network node.

In some aspects, the first network node 602 may transmit the indication to perform the handover by transmitting a handover request to a core network entity of a source network node attached to the UE. For example, the core network entity may be an AMF network entity, and the first network node 602 may be part of a disaggregated base station, as described with regard to FIG. 3. Accordingly, the first network node 602 may transmit the indication for the UE 604 to perform the handover (e.g., a handover request) to the AMF network entity, and the AMF network entity may forward the indication to a RAN network node that is a source network node to the UE 604.

In some aspects, the first network node 602 may transmit the indication to perform the handover based at least in part on receiving an indication from the AMF network entity. To illustrate, the UE 604 may transmit the navigation information to an application server based at least in part on an AS layer message, as described above. The application server may forward the navigation information to the AMF network entity based at least in part on a user plane function (UPF) and/or a session management function (SMF). In some aspects, such as when the first network node 602 acts as a source network node, the AMF network entity may transmit an indication to the first network node 602 to instruct the UE 604 to perform a handover, such as when the UE 604 is within a distance threshold of a handover boundary. Accordingly, the first network node 602 may transmit the indication for the UE to perform the handover based at least in part on receiving the instruction from the AMF network entity.

Alternatively, or additionally, the first network node 602 may be a different network entity than a RAN network entity that is the source network node, and the first network node 602 may transmit a handover request to the RAN network entity. However, in other aspects, the first network node 602 may be the RAN network node (e.g., the source network node attached to the UE 604), and may transmit the indication to the UE 604.

As shown by reference number 660, the UE 604 may perform a handover from a source network node (e.g., the first network node 602 and/or a RAN network node) to a target network node (e.g., the second network node 606). Performing the handover may include the UE 604 communicating with the first network node 602 and/or the second network node 606. As one example, as part of performing a handover, the UE 604 may establish a link to the second network node 606 and tear down a link with the first network node 602 (or another network node acting as the source network node).

In some aspects, the first network node 602 may instruct the UE 604 to generate and/or return a measurement report. After transmitting the indication to perform the handover, the first network node 602 may indicate to generate and return a measurement report. As one example, for a handover associated with a source terrestrial network node and a target non-terrestrial network node, the first network node 602 may instruct the UE 604 to generate a measurement report that is based at least in part on the target non-terrestrial network node, and/or to transmit the measurement report to the source network node (e.g., the first network node 602 or a RAN network node). Accordingly, the source network node may determine whether to proceed with performing the handover of the UE 604 to the second network node 606. Accordingly, the handover may be a conditional handover that is initiated based at least in part on a handover boundary, and performed based at least in part on a signal metric of the second network node 606 satisfying a handover threshold. However, in other examples, the UE 604 may perform the handover to the second network node 606 without generating and/or transmitting a measurement report associated with the second network node 606.

A handover boundary may indicate a preferred network node, a preferred network node type (e.g., a terrestrial network node type or a non-terrestrial network node type), and/or a preferred location for performing a handover. As described above, the preferred network node, the preferred network node type, and/or the preferred location may be selected based at least in part on meeting an operating condition at a UE and/or a coverage quality metric associated with the preferred network node. Selecting a preferred network node, a preferred network node type, and/or a preferred location for performing a handover may reduce signaling overhead at the UE and/or prevent a handover to a non-preferred network node, resulting in increased data throughput, reduced data transfer latencies, and/or reduced service interruptions at the UE.

As indicated above, FIG. 6 is provided as an example. Other examples may differ from what is described with regard to FIG. 6.

Figure 7:
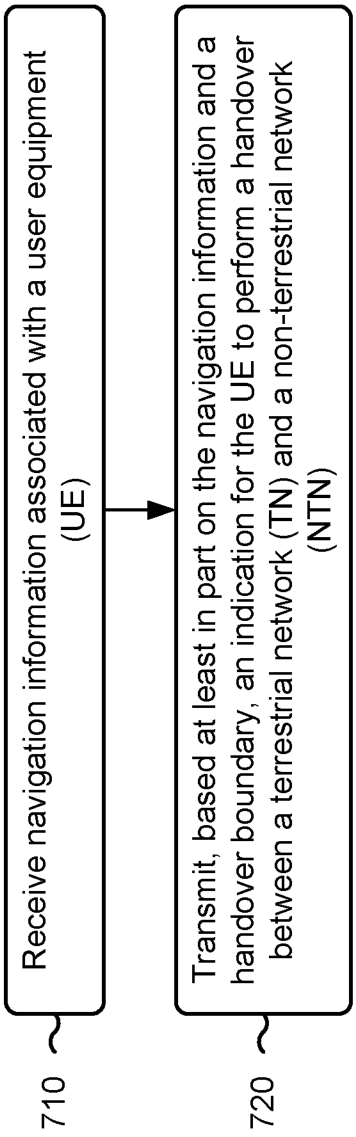
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with mobility management for handovers between a TN and an NTN.

As shown in FIG. 7, in some aspects, process 700 may include receiving navigation information associated with a UE (block 710). For example, the network node (e.g., using reception component 802 and/or communication manager 806, depicted in FIG. 8) may receive navigation information associated with a UE, as described above.

As further shown in FIG. 7, in some aspects, process 700 may include transmitting, based at least in part on the navigation information and a handover boundary, an indication for the UE to perform a handover between a TN and an NTN (block 720). For example, the network node (e.g., using transmission component 804 and/or communication manager 806, depicted in FIG. 8) may transmit, based at least in part on the navigation information and a handover boundary, an indication for the UE to perform a handover between a TN and an NTN, as described above.

Process 700 may include additional aspects, such as any single aspect or any combination of aspects described below and/or in connection with one or more other processes described elsewhere herein.

In a first aspect, the navigation information includes at least one of baseline navigation information, or updated navigation information.

In a second aspect, receiving the navigation information includes receiving the navigation information in at least one of an application layer message, an NAS layer message, or an AS layer message.

In a third aspect, receiving the navigation information includes receiving updated navigation information that indicates an updated position of the UE.

In a fourth aspect, receiving the updated navigation information includes receiving the updated navigation information periodically.

In a fifth aspect, the updated navigation information is based at least in part on global navigation satellite system coordinates.

In a sixth aspect, the updated navigation information includes at least one of a landmark identifier, or a set of locations.

In a seventh aspect, process 700 includes obtaining a handover boundary map that specifies one or more network-selected handover boundaries for performing the handover between the TN and the NTN, the handover boundary is a first network-selected handover boundary of the one or more network-selected handover boundaries, and the handover boundary map is based at least in part on at least a first cell coverage area provided by the TN and a second cell coverage area provided by the NTN.

In an eighth aspect, obtaining the handover boundary map includes at least one of obtaining the handover boundary map from an application server, obtaining the handover boundary map from a core network entity, or obtaining the handover boundary map from a RAN network node.

In a ninth aspect, obtaining the handover boundary map includes: calculating the handover boundary map based at least in part on at least one of: a QoS flow, a 5th generation QoS identifier value, or a coverage quality metric.

In a tenth aspect, the coverage quality metric includes at least one of an experienced signal metric, an experienced data throughput, or an experienced data rate.

In an eleventh aspect, process 700 includes identifying a trigger event associated with transmitting the indication for the UE to perform the handover, and transmitting the indication for the UE to perform the handover is based at least in part on identifying the trigger event.

In a twelfth aspect, process 700 includes calculating, based at least in part on the navigation information, a distance between an updated position of the UE and the handover boundary, and determining, as the trigger event, that the distance satisfies a handover distance threshold.

In a thirteenth aspect, transmitting the indication for the UE to perform the handover includes transmitting the indication without obtaining a current quality metric associated with a target network node of the handover.

In a fourteenth aspect, the network node is a RAN network node, and identifying the trigger event is based at least in part on the UE being attached to the RAN network node.

In a fifteenth aspect, the RAN network node is a TN network node, and the handover is from the TN to the NTN.

In a sixteenth aspect, the RAN network node is an NTN network node, and the handover is from the NTN to the TN.

In a seventeenth aspect, transmitting the indication for the UE to perform the handover includes transmitting a handover request to a core network entity of a source network node attached to the UE.

In an eighteenth aspect, the core network entity is an AMF network entity.

In a nineteenth aspect, transmitting the indication for the UE to perform the handover includes transmitting a handover request to a RAN network entity that is a source network node attached to the UE.

In a twentieth aspect, the network node is a RAN network node that is a source network node attached to the UE, and process 700 includes receiving, from a core network entity, a handover boundary indication, calculating, based at least in part on the navigation information, a distance between an updated position of the UE and the handover boundary, and determining that the distance satisfies a handover distance threshold, and transmitting the indication for the UE to perform the handover includes transmitting, to the core network entity, a handover request that indicates a request to perform the handover between the TN and the NTN.

In a twenty-first aspect, process 700 includes obtaining a current quality metric associated with a target network node of the handover, and determining that the current quality metric satisfies a quality threshold. In some aspects, transmitting the indication for the UE to perform the handover is based at least in part on the current quality metric satisfying the quality threshold.

In a twenty-second aspect, transmitting the indication for the UE to perform the handover is based at least in part on navigation-based handovers being enabled.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
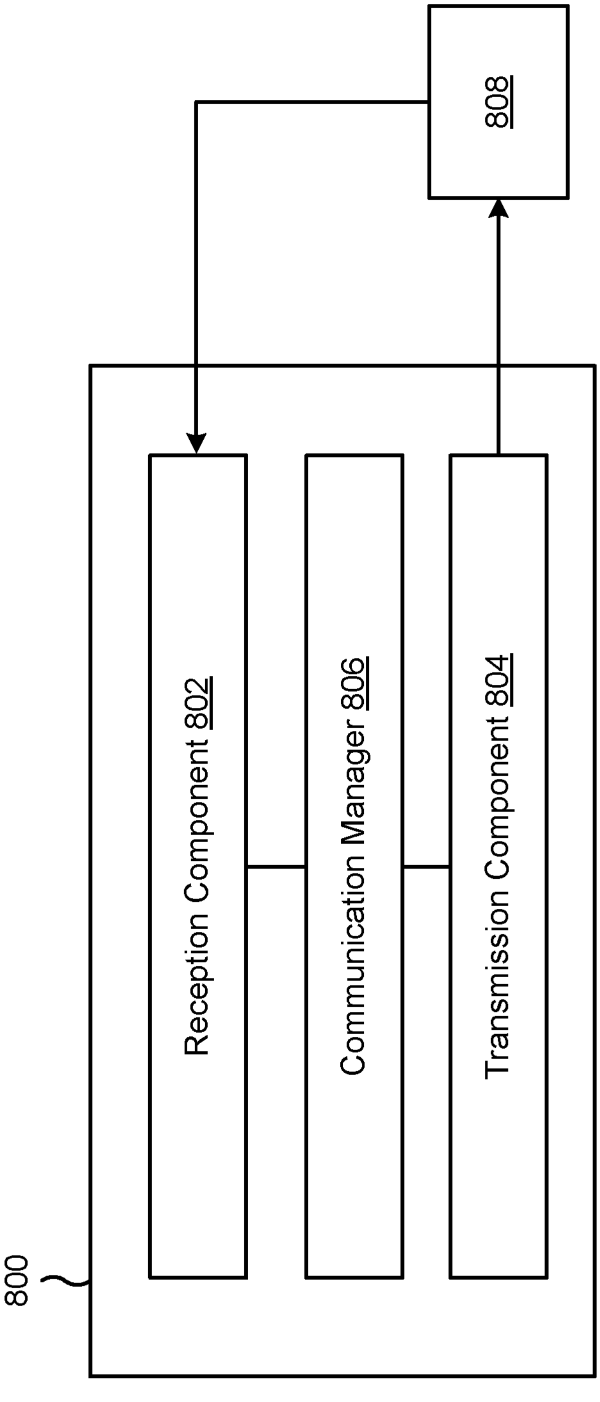
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a network node, or a network node may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 150 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 5-7. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2. In some aspects, the reception component 802 and/or the transmission component 804 may include or may be included in a network interface. The network interface may be configured to obtain and/or output signals for the apparatus 800 via one or more communications links, such as a backhaul link, a midhaul link, and/or a fronthaul link.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The communication manager 806 may receive, by way of the reception component 802, navigation information associated with a UE. The communication manager 806 may transmit, by way of the transmission component 804) and based at least in part on the navigation information and a handover boundary, an indication for the UE to perform a handover between a TN and an NTN.

The communication manager 806 may obtain, by way of the reception component 802, a handover boundary map that specifies one or more network-selected handover boundaries for performing the handover between the TN and the NTN, the handover boundary is a first network-selected handover boundary of the one or more network-selected handover boundaries, and the handover boundary map is based at least in part on at least a first cell coverage area provided by the TN and a second cell coverage area provided by the NTN. Alternatively or additionally, the communication manager 806 may calculate the handover boundary map.

The communication manager 806 may identify a trigger event associated with transmitting the indication for the UE to perform the handover, and transmitting the indication for the UE to perform the handover is based at least in part on identifying the trigger event.

The communication manager 806 may calculate, based at least in part on the navigation information, a distance between an updated position of the UE and the handover boundary.

The communication manager 806 may determine, as the trigger event, that the distance satisfies a handover distance threshold.

The reception component 802 may obtain a current quality metric associated with a target network node of the handover.

The communication manager 806 may determine that the current quality metric satisfies a quality threshold.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a network node, comprising: receiving navigation information associated with a user equipment (UE); and transmitting, based at least in part on the navigation information and a handover boundary, an indication for the UE to perform a handover between a terrestrial network (TN) and a non-terrestrial network (NTN).

Aspect 2: The method of Aspect 1, wherein the navigation information includes at least one of: baseline navigation information, or updated navigation information.

Aspect 3: The method of any of Aspects 1-2, wherein receiving the navigation information includes: receiving the navigation information in at least one of: an application layer message, a non-access-stratum-layer message, or an access stratum layer message.

Aspect 4: The method of any of Aspects 1-3, wherein receiving the navigation information includes: receiving updated navigation information that indicates an updated position of the UE.

Aspect 5: The method of Aspect 4, wherein receiving the updated navigation information includes: receiving the updated navigation information periodically.

Aspect 6: The method of Aspect 4 or Aspect 5, wherein the updated navigation information is based at least in part on global navigation satellite system coordinates.

Aspect 7: The method of any of Aspects 4-6, wherein the updated navigation information includes at least one of: a landmark identifier, or a set of locations.

Aspect 8: The method of any of Aspects 1-7, further including: obtaining a handover boundary map that specifies one or more network-selected handover boundaries for performing the handover between the TN and the NTN, wherein the handover boundary is a first network-selected handover boundary of the one or more network-selected handover boundaries, and wherein the handover boundary map is based at least in part on at least a first cell coverage area provided by the TN and a second cell coverage area provided by the NTN.

Aspect 9: The method of Aspect 8, wherein obtaining the handover boundary map includes at least one of: obtaining the handover boundary map from an application server; obtaining the handover boundary map from a core network entity; or obtaining the handover boundary map from a radio access network (RAN) network node.

Aspect 10: the method of Aspect 8, wherein obtaining the handover boundary map includes: calculating the handover boundary map based at least in part on at least one of: a quality-of-service (QoS) flow, a 5th generation QoS identifier value, or a coverage quality metric.

Aspect 11: The method of Aspect 10, wherein the coverage quality metric includes at least one of: an experienced signal metric, an experienced data throughput, or an experienced data rate.

Aspect 12: The method of any of Aspects 1-11, further including: identifying a trigger event associated with transmitting the indication for the UE to perform the handover, wherein transmitting the indication for the UE to perform the handover is based at least in part on identifying the trigger event.

Aspect 13: The method of Aspect 12, further including: calculating, based at least in part on the navigation information, a distance between an updated position of the UE and the handover boundary; and determining, as the trigger event, that the distance satisfies a handover distance threshold.

Aspect 14: The method of Aspect 13, wherein transmitting the indication for the UE to perform the handover includes: transmitting the indication without obtaining a current quality metric associated with a target network node of the handover.

Aspect 15: The method of Aspect 12, wherein the network node is a radio access network (RAN) network node, and wherein identifying the trigger event is based at least in part on the UE being attached to the RAN network node.

Aspect 16: The method of Aspect 15, wherein the RAN network node is a TN network node, and wherein the handover is from the TN to the NTN.

Aspect 17: The method of Aspect 15, wherein the RAN network node is an NTN network node, and wherein the handover is from the NTN to the TN.

Aspect 18: The method of any of Aspects 1-17, wherein transmitting the indication for the UE to perform the handover includes: transmitting a handover request to a core network entity of a source network node attached to the UE.

Aspect 19: The method of Aspect 18, wherein the core network entity is an access and mobility management function (AMF) network entity.

Aspect 20: The method of any of Aspects 1-19 wherein the network node is a core network entity, and wherein transmitting the indication for the UE to perform the handover includes: transmitting a handover request to a radio access network (RAN) network entity that is a source network node attached to the UE.

Aspect 21: The method of any of Aspects 1-20, wherein the network node is a radio access network (RAN) network node that is a source network node attached to the UE, and the method further includes: receiving, from a core network entity, a handover boundary indication; calculating, based at least in part on the navigation information, a distance between an updated position of the UE and the handover boundary; and determining that the distance satisfies a handover distance threshold, wherein transmitting the indication for the UE to perform the handover includes: transmitting, to the core network entity, a handover request that indicates a request to perform the handover between the TN and the NTN.

Aspect 22: The method of any of Aspects 1-21, further including: obtaining a current quality metric associated with a target network node of the handover; and determining that the current quality metric satisfies a quality threshold; wherein transmitting the indication for the UE to perform the handover is based at least in part on the current quality metric satisfying the quality threshold, wherein transmitting the indication for the UE to perform the handover is based at least in part on the current quality metric satisfying the quality threshold.

Aspect 23: The method of any of Aspects 1-22, wherein transmitting the indication for the UE to perform the handover is based at least in part on navigation-based handovers being enabled.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
one or more memories; and
one or more processors, coupled to the one or more memories, which are configured, individually or in any combination, to:
receive location information associated with a user equipment (UE);
identify a trigger event based at least in part on a distance between a location of the UE and a handover boundary satisfying a handover distance threshold, wherein the location of the UE is based on the location information; and
transmit, based at least in part on the identification of the trigger event, an indication for the UE to perform a handover between a terrestrial network (TN) and a non-terrestrial network (NTN).

2. The apparatus of claim 1, wherein the one or more processors, to receive the location information, are configured to:
receive the location information in at least one of:
an application layer message,
a non-access-stratum-layer message, or
an access stratum layer message.

3. The apparatus of claim 1, wherein the one or more processors, to receive the location information, are configured to:
receive updated location information that indicates an updated position of the UE.

4. The apparatus of claim 3, wherein the one or more processors, to receive the updated location information, are configured to:
receive the updated location information periodically.

5. The apparatus of claim 3, wherein the updated location information is based at least in part on global navigation satellite system coordinates.

6. The apparatus of claim 3, wherein the updated location information includes at least one of:
a landmark identifier, or
a set of locations.

7. The apparatus of claim 1, wherein the one or more processors are further configured to:
obtain a handover boundary map that specifies one or more network-selected handover boundaries for performing the handover between the TN and the NTN, wherein the handover boundary is a first network-selected handover boundary of the one or more network-selected handover boundaries, and wherein the handover boundary map is based at least in part on at least a first cell coverage area provided by the TN and a second cell coverage area provided by the NTN.

8. The apparatus of claim 7, wherein the one or more processors, to obtain the handover boundary map, are configured to:
obtain the handover boundary map from an application server;
obtain the handover boundary map from a core network entity; or
obtain the handover boundary map from a radio access network (RAN) network node.

9. The apparatus of claim 7, wherein the one or more processors, to obtain the handover boundary map, are configured to:
calculate the handover boundary map based at least in part on at least one of:
a quality-of-service (QoS) flow,
a 5th generation QoS identifier value, or
a coverage quality metric.

10. The apparatus of claim 9, wherein the coverage quality metric includes at least one of:
an experienced signal metric,
an experienced data throughput, or
an experienced data rate.

11. The apparatus of claim 1, wherein the one or more processors are further configured to:
calculate, based at least in part on the location information, a distance between an updated position of the UE and the handover boundary; and
determine, as the trigger event, that the distance satisfies the handover distance threshold.

12. The apparatus of claim 1, wherein the one or more processors, to transmit the indication for the UE to perform the handover, are configured to:
transmit the indication without obtaining a current quality metric associated with a target network node of the handover.

13. The apparatus of claim 1, wherein the network node is a radio access network (RAN) network node, and wherein identifying the trigger event is further based at least in part on the UE being attached to the RAN network node.

14. The apparatus of claim 13, wherein the RAN network node is a TN network node, and wherein the handover is from the TN to the NTN.

15. The apparatus of claim 13, wherein the RAN network node is an NTN network node, and wherein the handover is from the NTN to the TN.

16. The apparatus of claim 1, wherein the one or more processors, to transmit the indication for the UE to perform the handover, are configured to:
transmit a handover request to a core network entity of a source network node attached to the UE.

17. The apparatus of claim 16, wherein the core network entity is an access and mobility management function (AMF) network entity.

18. The apparatus of claim 1, wherein the network node is a core network entity, and wherein the one or more processors, to transmit the indication for the UE to perform the handover, are configured to:
transmit a handover request to a radio access network (RAN) network entity that is a source network node attached to the UE.

19. The apparatus of claim 1, wherein the one or more processors are further configured to:
receive, from a core network entity, a handover boundary indication;
calculate, based at least in part on the location information, a distance between an updated position of the UE and the handover boundary; and
determine that the distance satisfies a handover distance threshold, wherein the one or more processors, to transmit the indication for the UE to perform the handover, are configured to:
transmit, to the core network entity, a handover request that indicates a request to perform the handover between the TN and the NTN.

20. The apparatus of claim 1, wherein the one or more processors are further configured to:
obtain a current quality metric associated with a target network node of the handover; and
determine that the current quality metric satisfies a quality threshold, wherein the one or more processors, to transmit the indication for the UE to perform the handover, are further configured to transmit the indication based at least in part on the current quality metric satisfying the quality threshold.

21. The apparatus of claim 1, wherein the one or more processors, to transmit the indication for the UE to perform the handover, are further configured to transmit the indication based at least in part on location-based handovers being enabled.

22. A method of wireless communication performed by a network node, comprising:
receiving location information associated with a user equipment (UE);
identifying a trigger event based at least in part on a distance between a location of the UE and a handover boundary satisfying a handover distance threshold, wherein the location of the UE is based on the location information; and
transmitting, based at least in part on identifying the trigger event, an indication for the UE to perform a handover between a terrestrial network (TN) and a non-terrestrial network (NTN).

23. The method of claim 22, further including:
obtaining a handover boundary map that specifies one or more network-selected handover boundaries for performing the handover between the TN and the NTN, wherein the handover boundary is a first network-selected handover boundary of the one or more network-selected handover boundaries, and wherein the handover boundary map is based at least in part on at least a first cell coverage area provided by the TN and a second cell coverage area provided by the NTN.

24. The method of claim 23, wherein obtaining the handover boundary map includes at least one of:
obtaining the handover boundary map from an application server;
obtaining the handover boundary map from a core network entity; or
obtaining the handover boundary map from a radio access network (RAN) network node.

25. The method of claim 24, wherein obtaining the handover boundary map includes:
calculating the handover boundary map based at least in part on at least one of:
a quality-of-service (QoS) flow,
a 5th generation QoS identifier value, or
a coverage quality metric.

26. The method of claim 22, further including:
obtaining a current quality metric associated with a target network node of the handover; and
determining that the current quality metric satisfies a quality threshold;
wherein transmitting the indication for the UE to perform the handover is based at least in part on the current quality metric satisfying the quality threshold.

27. A non-transitory computer-readable medium storing a set of instructions for wireless communication, the set of instructions comprising:
one or more instructions that, when executed by one or more processors of a network node, cause the network node to:
receive location information associated with a user equipment (UE);
identify a trigger event based at least in part on a distance between a location of the UE and a handover boundary satisfying a handover distance threshold, wherein the location of the UE is based on the location information; and
transmit, based at least in part on the identification of the trigger event, an indication for the UE to perform a handover between a terrestrial network (TN) and a non-terrestrial network (NTN).

28. The non-transitory computer-readable medium of claim 27, wherein the one or more instructions, to receive the location information, further cause the network node to:

receive the location information in at least one of:

an application layer message, a non-access-stratum-layer message, or an access stratum layer message.

29. The non-transitory computer-readable medium of claim 27, wherein the one or more instructions, to receive the location information, further cause the network node to:

receive updated location information that indicates an updated position of the UE.

30. An apparatus for wireless communication, comprising:

means for receiving location information associated with a user equipment (UE);

means for identifying a trigger event based at least in part on a distance between a location of the UE and a handover boundary satisfying a handover distance threshold, wherein the location of the UE is based on the location information; and means for transmitting, based at least in part on identifying the trigger event, an indication for the UE to perform a handover between a terrestrial network (TN) and a non-terrestrial network (NTN).

* * * * *